(12) United States Patent
Bietry et al.

(10) Patent No.: US 7,988,306 B2
(45) Date of Patent: Aug. 2, 2011

(54) AFOCAL ATTACHMENT FOR PROJECTION LENS

(75) Inventors: Joseph R. Bietry, Rochester, NY (US); Barry D. Silverstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 495 days.

(21) Appl. No.: 12/244,032

(22) Filed: Oct. 2, 2008

(65) Prior Publication Data

US 2010/0085993 A1    Apr. 8, 2010

(51) Int. Cl.
*G03B 21/14*  (2006.01)
*G03B 21/28*  (2006.01)
*G02B 3/00*   (2006.01)
*G02B 15/14*  (2006.01)
*G02B 17/00*  (2006.01)
*G02B 13/00*  (2006.01)
*H04N 5/74*   (2006.01)

(52) U.S. Cl. .......... 353/101; 353/98; 353/121; 359/651; 359/649; 359/733; 359/689; 359/744; 359/735; 348/771

(58) Field of Classification Search .......... 353/101, 353/98, 121; 359/651, 649, 733, 689, 744, 359/735; 348/771
See application file for complete search history.

(56) References Cited

U.S. PATENT DOCUMENTS

| | | | |
|---|---|---|---|
| 2,956,475 A | 10/1960 | Harris et al. | |
| 3,302,516 A | 2/1967 | Stapsy | |
| 3,409,346 A | 11/1968 | Stapsy | |
| 4,621,890 A * | 11/1986 | Suzuki et al. | 359/744 |
| 5,870,228 A | 2/1999 | Kreitzer et al. | |
| 6,417,971 B1 | 7/2002 | Moskovich | |
| RE39,424 E | 12/2006 | Moskovich | |
| 7,184,219 B2 * | 2/2007 | Kobayashi | 359/651 |
| 2002/0140913 A1 | 10/2002 | Yoneyama et al. | |

* cited by examiner

Primary Examiner — Georgia Y Epps
Assistant Examiner — Magda Cruz

(57) ABSTRACT

A projection apparatus has a spatial light modulator to modulate illumination from a laser light source. A base projection lens has, from its long conjugate side to its short conjugate side, a first lens group with negative focal length and with a first lens element that has a negative focal length and a second lens element of positive focal length, a second lens group of negative focal length and spaced apart from the first lens group and having one or more cemented lens elements, and a third lens group spaced apart from the second lens group and having a lens with a positive focal length. The base projection lens has a first field of view and is telecentric in its short conjugate. An afocal attachment to the base projection lens alters the first field of view by the same amount in both of two orthogonal directions.

20 Claims, 15 Drawing Sheets

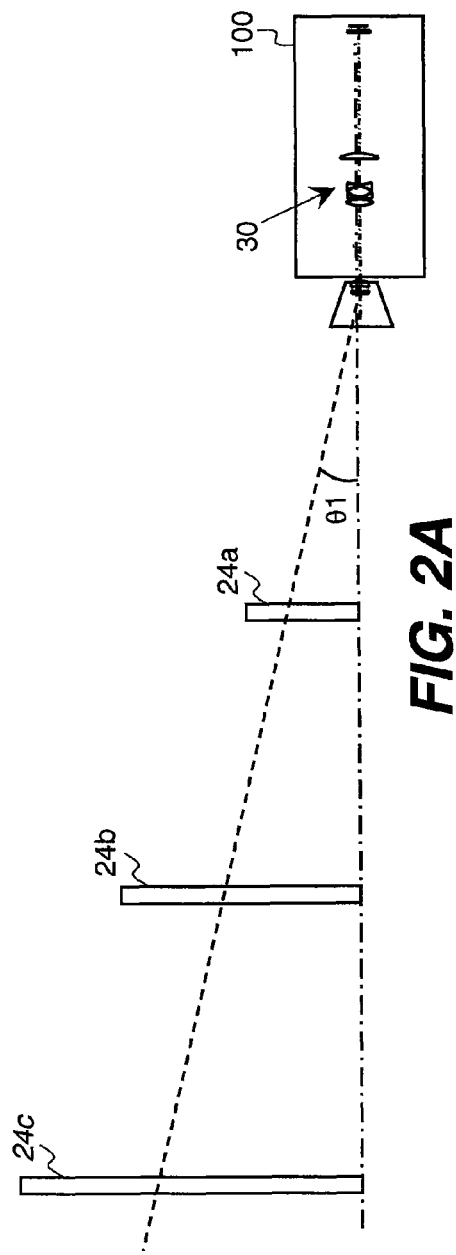
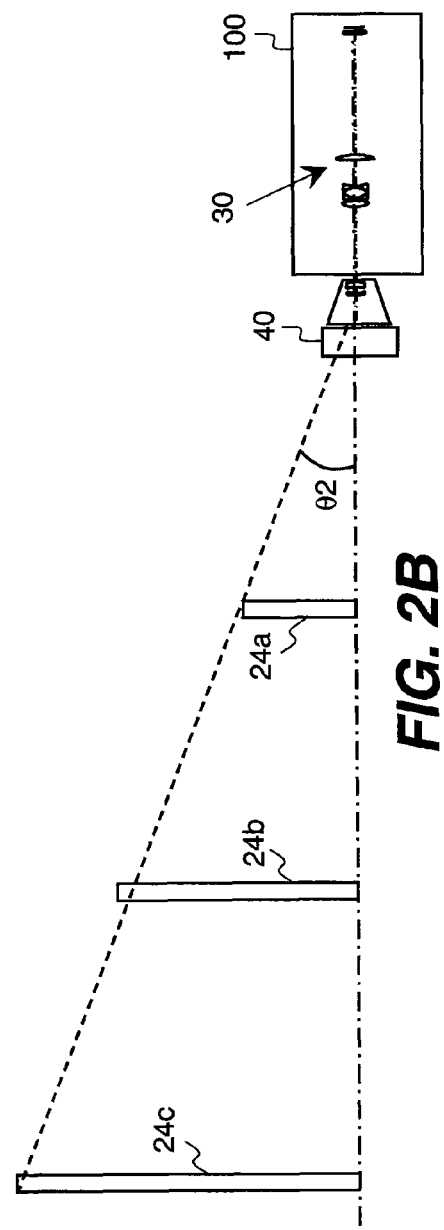

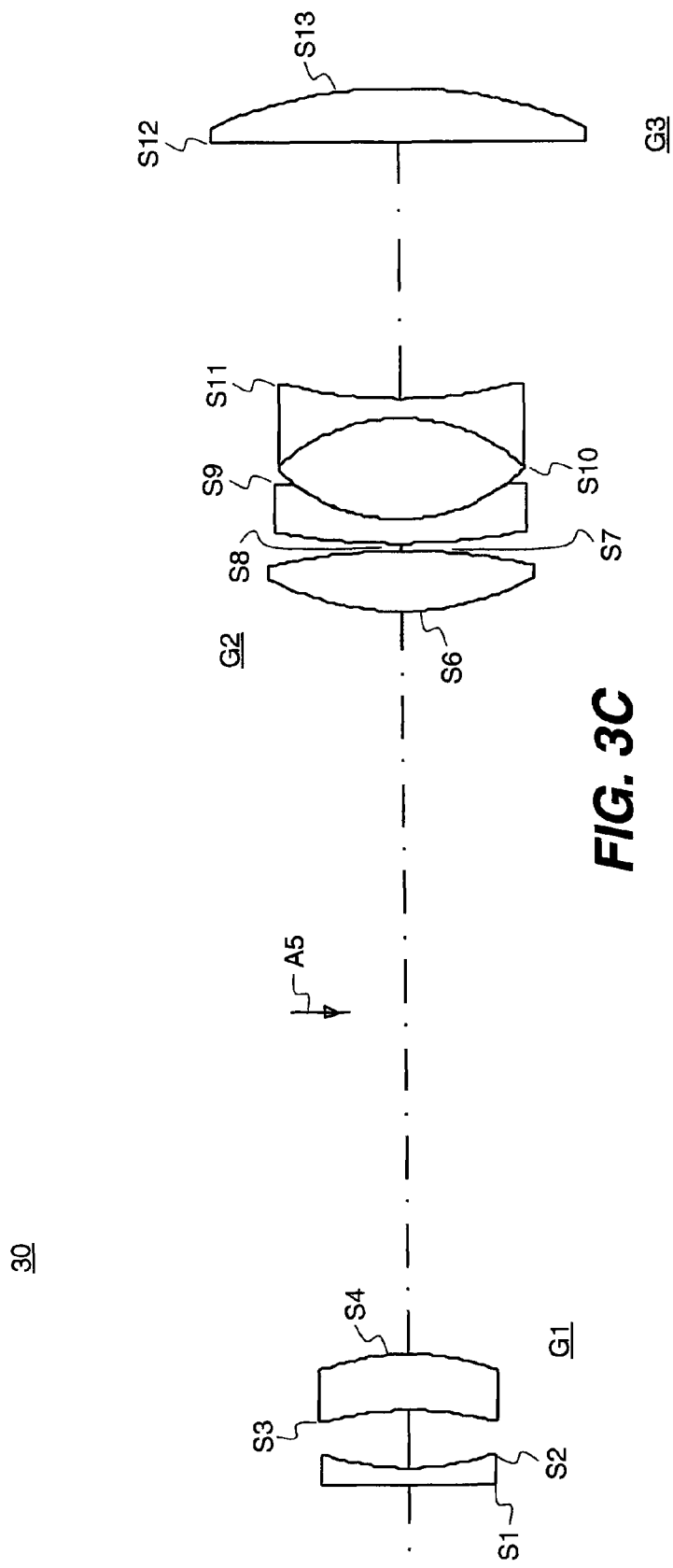

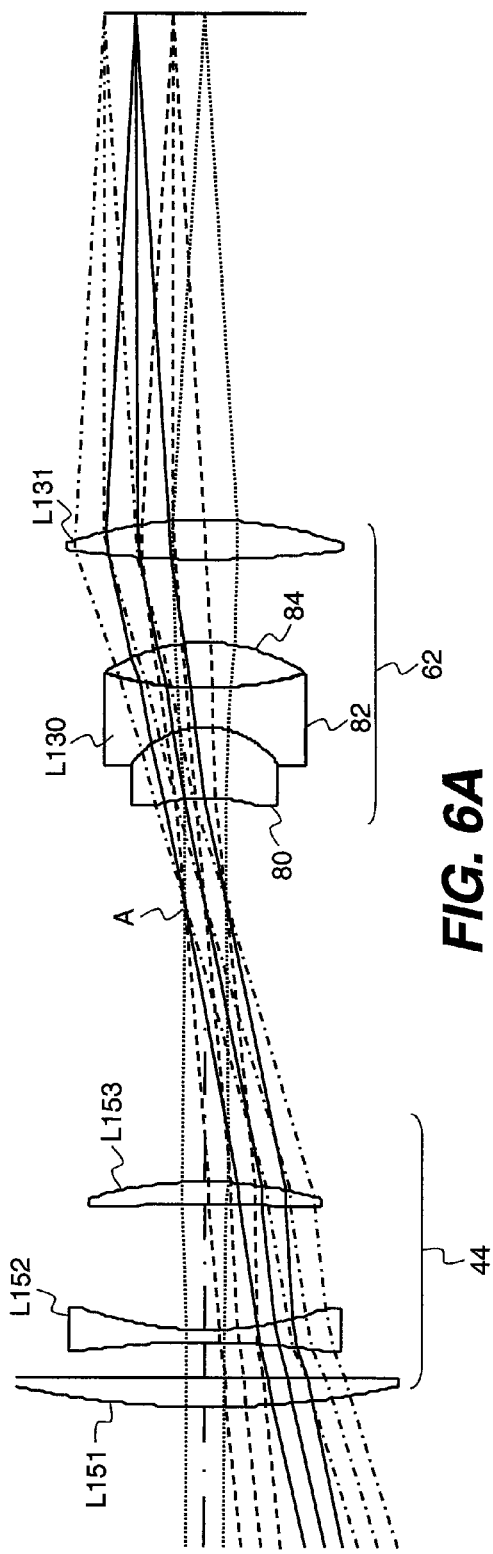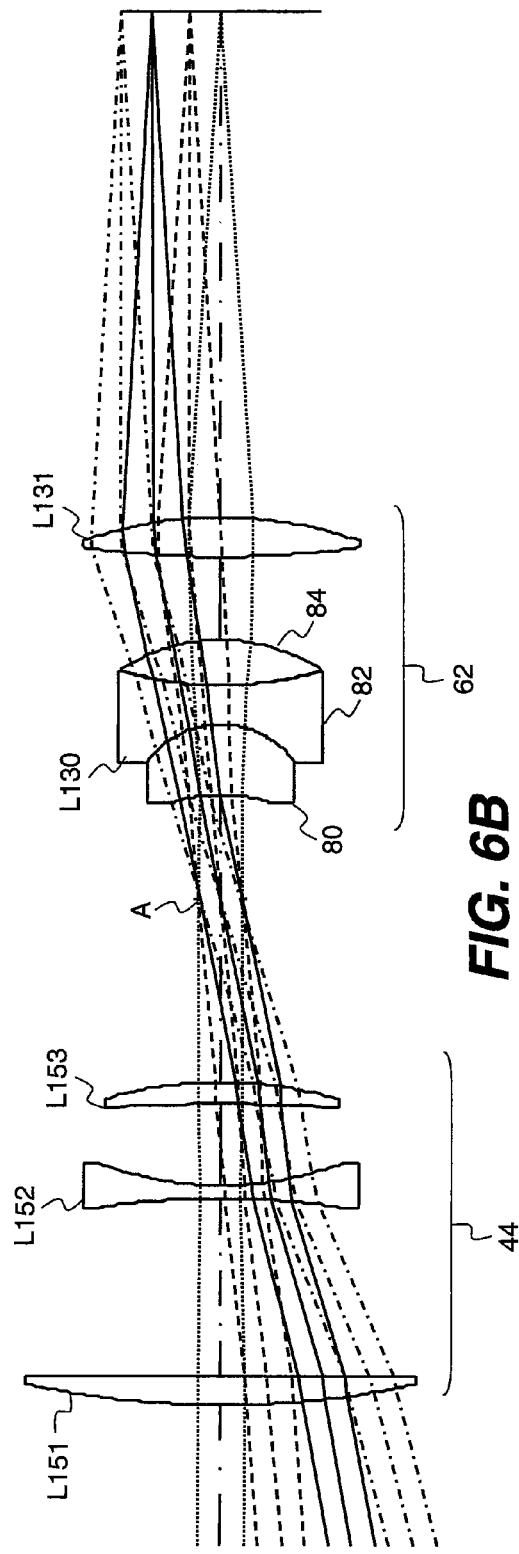

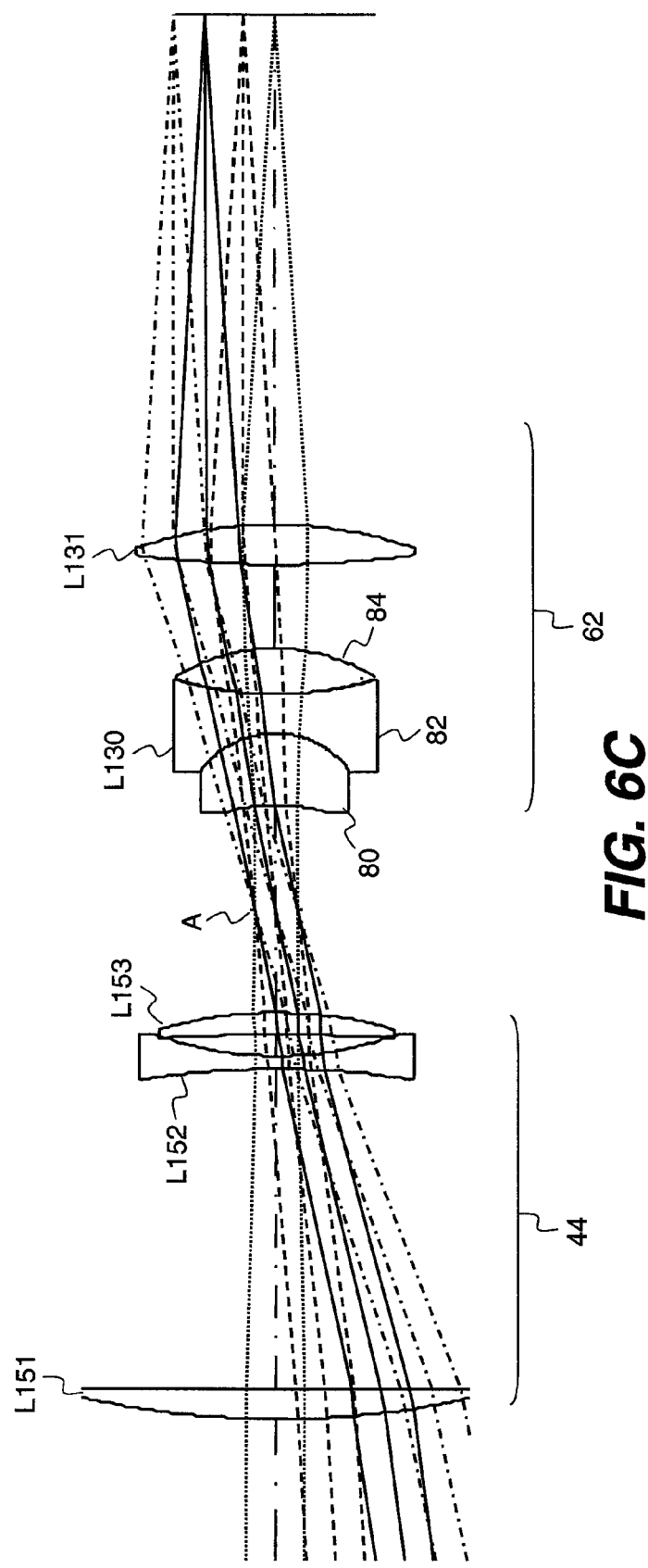

AFOCAL ATTACHMENT FOR PROJECTION LENS

FIELD OF THE INVENTION

The present invention relates generally to digital image projection and more particularly to projection apparatus using an afocal attachment for changing the field of view of a projection apparatus.

BACKGROUND OF THE INVENTION

Conventional projection lenses used for projecting an image onto a display surface are designed with relatively fast optics, often in the range of f/2 to f/2.5, characterized by handling light at large angles. The low f/# values and correspondingly high angular light are due, in large part, to the high etendue light sources that are used, such as various types of very bright arc lamps and similar light sources.

Pixelized spatial light modulators such as LCD modulators and Digital Micromirror Devices (DMDs), such as the DLP (Digital Light Processor) from Texas Instruments, Inc., Dallas, Tex., are electronic light modulation devices of particular interest for digital cinema and other projection applications. These devices can be used with the high-etendue light sources of conventional projection apparatus and various projection apparatus have been designed using these sources with DMD and LCD devices. However, the disadvantages of high-etendue light and the required optical components are constraints to performance and cost for these digitally controlled spatial light modulators, particularly for LCDs, where highly angular light is unfavorable for producing a quality projected image. The recent advent of solid-state laser light sources having very low etendue is particularly advantageous for LCDs as well as for DLP and other types of spatial light modulators. Among benefits of highly coherent laser light are that it allows the use of smaller, slower lens elements, with values in the f/8 range or slower, while still being capable of providing light of sufficient brightness for many projection applications.

There are a number of requirements for projection lens systems used with spatial light modulators that differ from requirements of conventional projection optics. Among these are the need for a long back focal length or working distance, that is, the distance between the last lens surface and the spatial light modulator. Working distances in excess of 2 times the lens focal length are needed in most cases, in order to accommodate a number of optical components used to combine modulated light from different color paths onto an optical axis and, depending on the type of spatial light modulator used, to provide polarization, filtering, and other conditioning and guiding of the light. A long back focal length helps to reduce the angle of illumination that is provided to the spatial light modulator.

Another desirable characteristic for the optical components in a digital projector is telecentricity, so that light across the field of the spatial light modulator has the same narrow range of angles. A high level of color correction and low distortion are also desirable. In order to provide lens designs that meet all of these requirements, designers have primarily concentrated on lens systems that are optimized for the particular projection environment, designed for a screen or other display surface of a particular size and positioned at a given distance from the projector. Some examples of projection optics for digital projectors are given in U.S. Pat. No. 5,870,228 entitled "Projection Lenses Having Large Back Focal Length to Focal Length Ratios" to Kreitzer et al. and U.S. Pat. No. RE39,424 entitled "Telecentric Lens Systems for Forming an Image of an Object Composed of Pixels" to Moskovich. A variable zoom projection apparatus is described in U.S. Pat. No. 6,417,791 entitled "Zoom Projection Lens Having a Lens Correction Unit" to Moskovich.

Lens attachments, familiar to camera users, have been used for providing various changes to the effective focal length and field of view of these image capture devices in forming images onto a film or onto a digital receiver. However, with the exception of specialized anamorphic lens attachments that adjust the image aspect ratio of film media for the projection screen in one dimension only, lens attachments have traditionally been avoided by projection lens designers for a number of reasons. In conventional projector design, the difficulties of controlling aberration and distortion with light at low f/# values make it highly undesirable to add further lens elements once an existing design is optimized for a certain range of angles and projection distance. In general, then, conventional projection optics design approaches are primarily directed to projection systems with fixed focus and field of view, so that, as a result, a projector is designed for a relatively narrow range of applications.

SUMMARY OF THE INVENTION

It is an object of the present invention to advance the art of digital image projection. With this object in mind, an embodiment of the present invention is characterized by a projection apparatus comprising:
  a) at least one spatial light modulator disposed to modulate illumination from a laser light source;
  b) a base projection lens comprising, from its long conjugate side to its short conjugate side along an optical axis:
    (i) a first lens group having a negative focal length and having at least a first lens element that has a negative focal length and a second lens element that has a positive focal length;
    (ii) a second lens group spaced apart from the first lens group and having one or more cemented lens elements, wherein the second lens group has a negative focal length;
    (iii) a third lens group spaced apart from the second lens group and comprising a lens having a positive focal length;
  wherein the base projection lens has a first field of view and is telecentric in its short conjugate; and
  c) an afocal attachment to the base projection lens that alters the first field of view by substantially the same amount in both of two orthogonal directions.

The apparatus of the present invention is particularly well-suited for spatial light modulators such as DLP devices that modulate light from a laser or other highly coherent light source. The present invention provides an optical system that is telecentric in its short conjugate space and has a relatively high f/#, which simplifies optical design and reduces the cost and size of lens elements and takes advantage of high brightness that can be obtained using laser light.

It is an advantage of the present invention that it allows a single projection lens design to be adapted for different fields of view, so that the same projector design can be used for apparatus in any of a number of different theater venues.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 2A and 2B are block diagrams showing how the afocal attachment of the present invention can be used to change the field of view of a projector;

FIG. 3C labels lens element surfaces for the base projection lens of the FIG. 3A embodiment;

FIGS. 6A, 6B, and 6C are schematic side views showing a zoom attachment in another embodiment of the present invention.

DETAILED DESCRIPTION OF THE INVENTION

Figure 1:
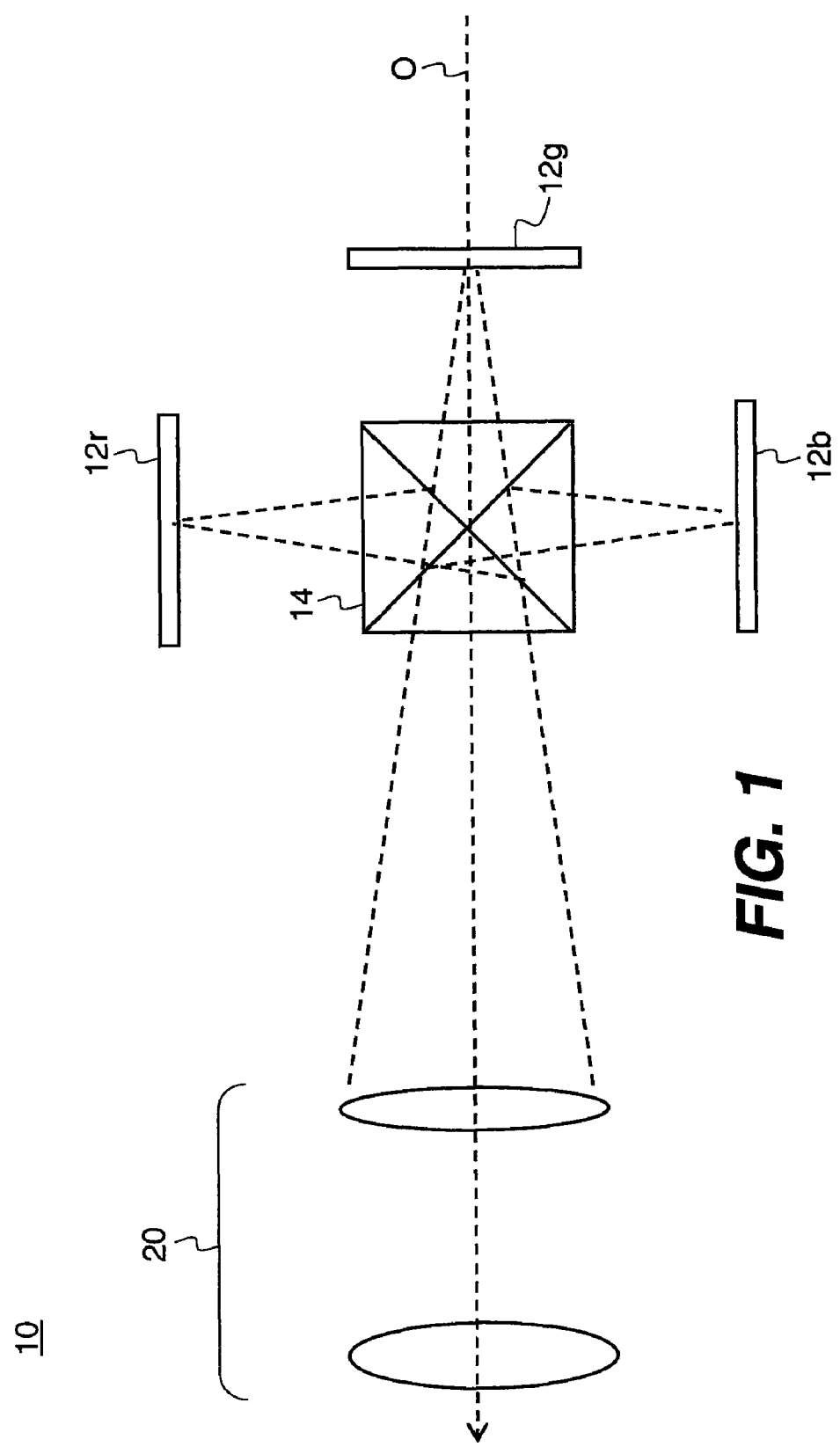
FIG. 1 is a simplified block diagram of a projector using spatial light modulators in three color channels.

For the detailed information that follows, it is to be understood that elements not specifically shown or described may take various forms well known to those skilled in the art. Figures shown and described herein are provided to illustrate key principles of operation and component relationships along their respective optical paths according to embodiments of the present invention and may not show actual size or scale. Some exaggeration may be necessary in order to emphasize basic structural relationships or principles of operation. In some cases, components that normally lie in the optical path of the projection apparatus are not shown, in order to describe the operation of projection optics more clearly.

A telecentric optical component or system has at least one pupil at infinity. This means that its principal rays are essentially parallel to the optical axis either in object space, in image space, or in both. In practice, having at least one pupil at infinity means that the pupil is at a relatively long distance from the optical component. To those skilled in the optical design arts, a lens is considered to be telecentric in a conjugate if its pupil is in the range of about 15 or more times the focal length of the lens or lens system in that conjugate.

The term "afocal" describes an optical component or system with object and image points effectively at infinity, as this concept is commonly understood by those skilled in the optical arts. The function of afocal optics is readily described by considering binoculars or the telescope, which basically provide an afocal attachment to the human eye. Looking through the eyepiece, the observer perceives a magnified image; looking through the opposite side of the lens system, the observer sees a reduced image, with a wider field of view. This same concept has proved useful in providing afocal attachments to camera optics for image capture. However, as noted in the Background section given earlier, afocal attachments have not previously been considered practical or desirable for projection optical systems that direct image-bearing light to a display screen or other display surface. Afocal optics can effectively alter the field of view, or alternately stated, the half-field of view, by reducing it or enlarging it.

The term "f-number" or f/# as used in the present disclosure has its conventional meaning, as the ratio of focal length to entrance pupil diameter.

The method and apparatus of the present invention provide a projection lens system that accepts one or more afocal attachments that similarly change the effective field of view and working distance of the projection optics. While such a solution would be avoided by lens designers of high-etendue projection systems, the inventors have found that this approach has particular advantages in conjunction with a projection lens system that uses a spatial light modulator that modulates light from a highly coherent illumination source that provides a relatively low etendue, such as a laser.

The simplified schematic of FIG. 1 shows a projection apparatus 10 with a projection lens 20 that forms an image using DLP (digital micromirror) devices as spatial light modulators 12r, 12g, and 12b. Modulated light from each of three or more color channels, typically Red (R), Green (G) and Blue (B), is combined onto the same optical path, axis O, at a dichroic combiner 14. Each spatial light modulator 12r, 12g, or 12b, lies at the back focal plane of the projection lens system, illustrating the need for a long working distance. This same model also applies for an LCD or other type of spatial light modulator used with such a system. Notably, because the illumination is from lasers, projection apparatus 10 can have a low etendue, typically in the range of about f/8. This is an advantage from an optical design perspective, allowing the use of smaller, slower, and less expensive lens elements.

The digital micromirror or DLP device works most effectively when its modulated light, the light reflected from its mirror elements, is telecentric, emerging substantially parallel to the optical axis. Low-etendue light sources such as lasers are advantaged for providing illumination in telecentric systems and are well-suited for providing DLP illumination sources. Low-etendue sources are also advantaged for providing increased back focus without significantly increasing lens diameter and have been found to provide excellent imaging performance.

While low etendue and telecentricity are advantageous for internal projector optics, the light output from the projector must provide sufficient Field of View (FOV) to fill the display screen or other display surface. The simplified block diagram of FIG. 2A shows a projection apparatus 100 having a projection lens 30 that provides a given field of view, conventionally expressed in terms of half-field of view (HFOV) and at an angle labeled θ1 in this figure. This enables projection apparatus 100 to project an image of certain size at a given distance, as shown here by display surfaces 24a, 24b, and 24c.

As was noted earlier, this angular half-FOV is typically fixed for projection apparatus in conventional design practice.

The simplified block diagram of FIG. 2B shows the use of an afocal attachment 40 to alter the field of view for the same projection apparatus 100, according to embodiments of the present invention. In the example shown, afocal attachment 40 increases the field of view with a larger half-field of view with angle labeled θ2. The needed field of view, generally expressed in terms of its half-field of view (HFOV) can vary from one projection site to the next. For example, projection in a small lecture hall or other small viewing facility may require a half-field of view that is in excess of 20 degrees. Projection onto a surface spaced across the length of a large facility such as a sports arena may require a half-field of view that is less than 10 degrees. Using conventional projector design approaches, a different projection lens would need to be designed for each of these applications and the illumination source would need to be appropriately sized. However, the inherent brightness of laser light sources can make it possible for the same projection engine to deliver sufficient light for applications in both small viewing room and longer distance or "arena" venues. The present invention makes it possible to use the same base projection optics for one set of projection conditions and to adapt the projection optics using one or more afocal attachments for changing the field of view without appreciably changing the back focal length.

Figure 2C:
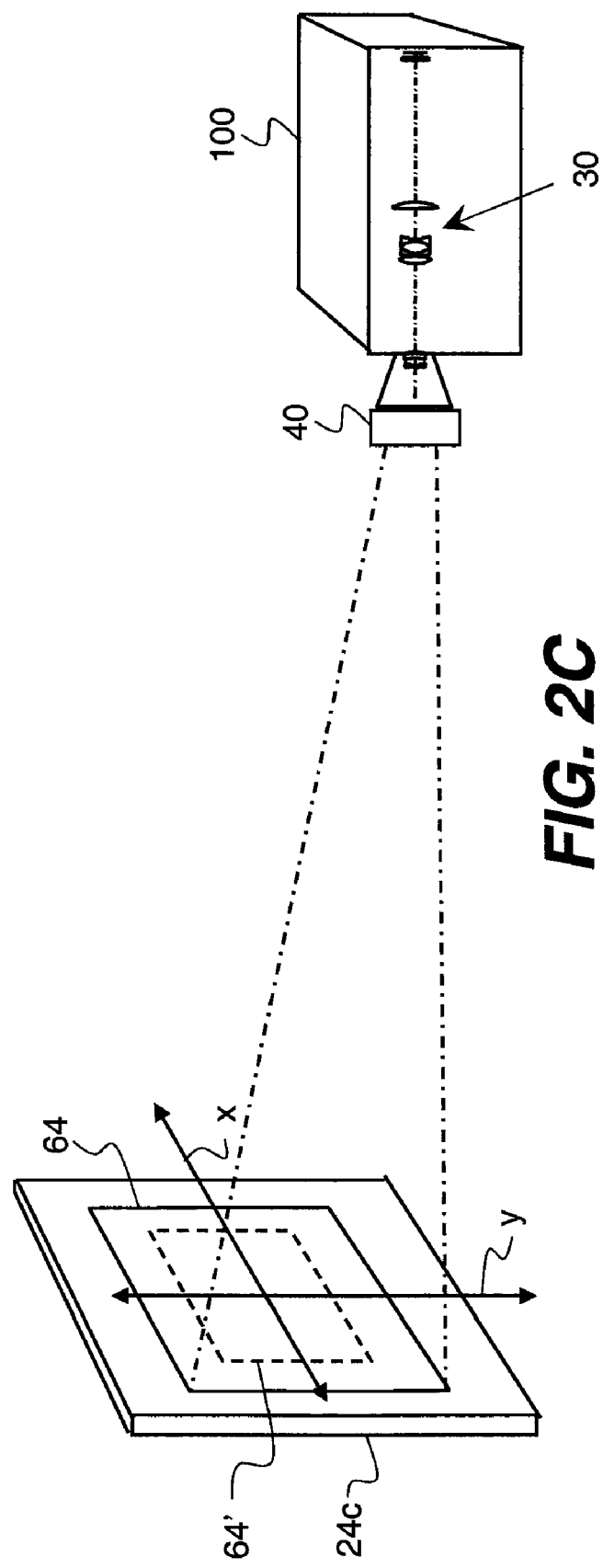
FIG. 2C is a block diagram perspective view showing alteration of field of view in two orthogonal dimensions using an afocal attachment.

FIG. 2C is a block diagram perspective view showing how the field of view of projection apparatus 100 is altered by the same magnification factor in two orthogonal dimensions, shown here along axes x and y, using afocal attachment 40. In this example, altering the field of view displays projected image 64 as larger, by substantially the same magnification factor in both orthogonal x and y directions, than original image 64' that would be provided by base projection lens 30 without the attachment. "Substantially the same" magnification in both orthogonal x and y directions refers to the magnification that is conventionally obtained using spherical lenses, symmetric about the optical axis, so that there is no noticeable height or width distortion visible to the viewer. This substantially equal enlargement or reduction of HFOV in both orthogonal directions, using spherical lenses, also distinguishes the function of afocal attachment 40 from that of anamorphic projector attachments, cylindrical lenses that have been used in conventional practice to provide greater than 1× magnification only along one axis in order to adapt film or digitally generated images to display screen aspect ratios.

Base Projection Lens

Figure 3A:
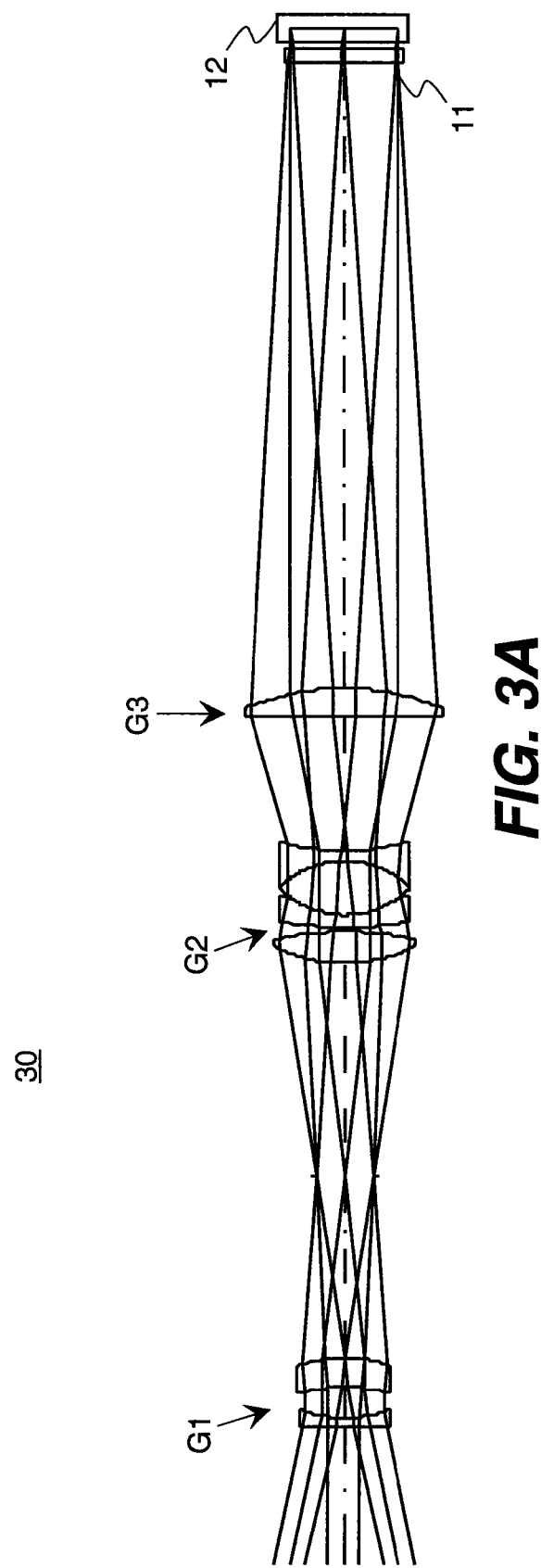
FIG. 3A is a schematic side view showing the base projection lens in one embodiment.

The schematic side view of FIG. 3A shows a base projection lens 30 according to one embodiment of the present invention. For clarity, combiners, beamsplitters, and other components described earlier with reference to FIG. 1 are not shown, but would be part of the optical system using base projection lens 30. Also, in FIG. 3A and subsequent figures, only the light path for a single modulation channel is shown, for simplicity of description relative to the projection optics. The modulation channel that is shown can be a single color channel, for example, without showing combiner 14 using the basic light modulation model described earlier with reference to FIG. 1. A spatial light modulator 12, such as a DLP device, modulates illumination from a laser source (not shown in FIG. 3A or subsequent figures) and provides telecentric output to projection lens 30. Projection lens 30 is thus considered to be telecentric with respect to its short conjugate. Spatial light modulator 12 typically includes a cover window 11 as part of the same component package.

Figure 3B:
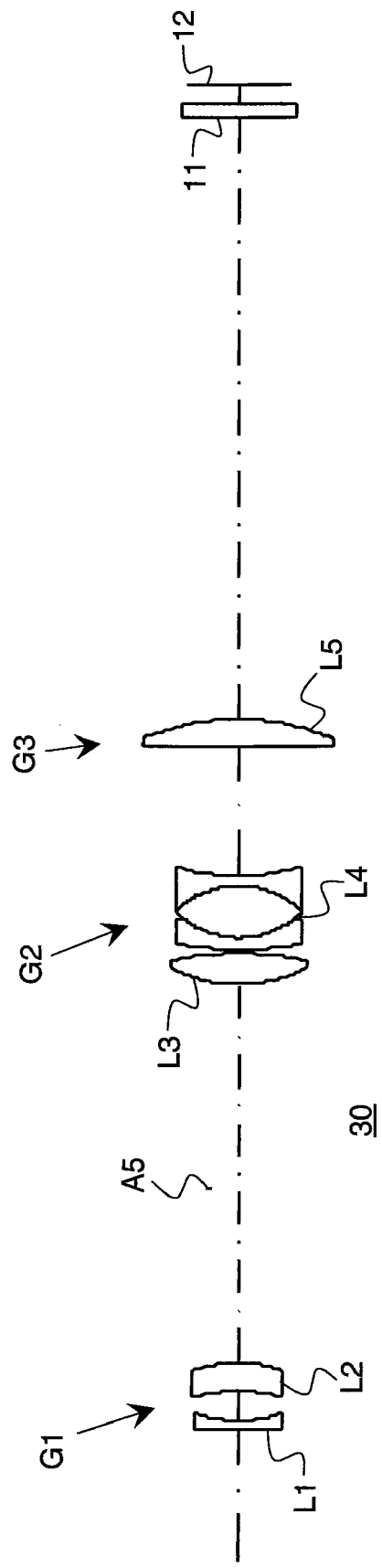
FIG. 3B shows lens elements that form the base projection lens of the FIG. 3A embodiment.

The side view of FIG. 3B shows the lens elements L1-L5 of projection lens 30 arranged into three lens groups, G1-G3, numbered from the long conjugate side (associated with the display surface) toward the short conjugate side (associated with spatial light modulator 12).

A lens group G3 is positioned nearest spatial light modulator 12 and has a single lens element L5 with positive power. This directs modulated light to a second lens group G2 that has positive power and includes a cemented triplet L4 having negative power in this embodiment. Lens L3 has positive power and directs light through an aperture A5 and to a lens group G1. Lens group G1 provides negative power by a combination of a meniscus lens L2 having positive power with a plano-concave lens L1 having negative power. FIG. 3C labels the various surfaces of projection lens 30. Table 1 gives exemplary focal lengths for the various lens elements of projection lens 30 in one embodiment of the present invention.

Projection lens 30 as shown in the embodiment of FIGS. 3A-3C is telecentric in its short conjugate (SLM side) and non-telecentric in its long conjugate (display surface side), with a half field of view fixed at about 12 degrees and a back focal length of about 2.5 times the focal length. This is suitable for some types of projection applications, but constrains use of projection lens 30 to a relatively limited range of screen sizes and distances.

Afocal Attachment

Figure 4A:
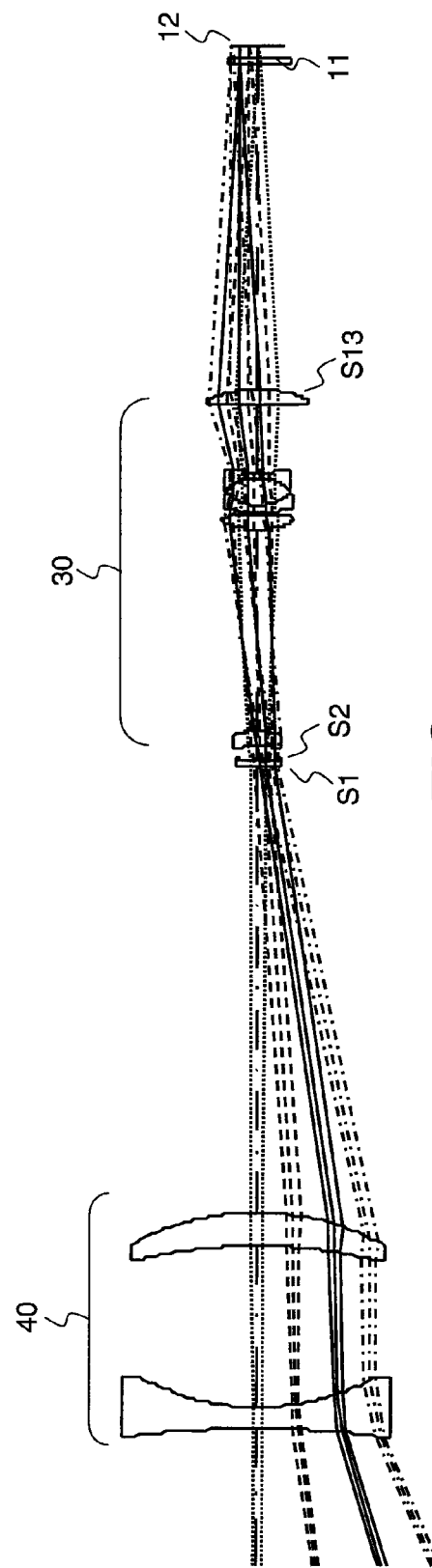
FIG. 4A is a schematic side view showing an afocal attachment added to the projection lens of FIG. 3A.
Figure 4B:
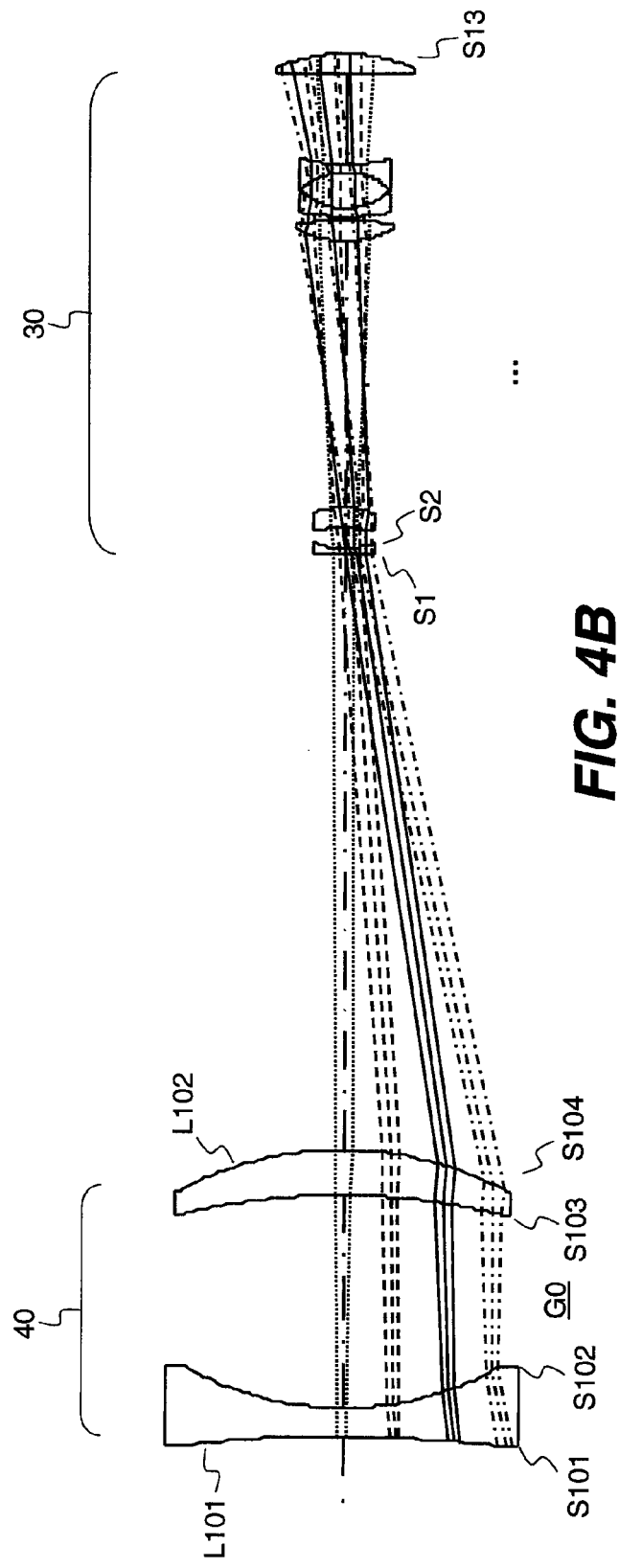
FIG. 4B is an enlarged schematic diagram of the afocal attachment relative to the base projection lens.

In order to allow the use of projection lens 30 in a broader range of applications, the apparatus and method of embodiments of the present invention add afocal attachment 40 to the front of projection lens 30 as was described earlier with reference to FIG. 2B. The schematic side view of FIG. 4A shows components of an afocal attachment 40 added to projection lens 30 of FIGS. 3A-3C in an embodiment that increases the half field of view from its original value (~12 degrees) to 23 degrees. The enlarged schematic side view of FIG. 4B shows surface designations S101-S104 for lens elements L101 and L102 of afocal attachment 40, labeled as lens group G0 and shows its relation to base projection lens 30. Table 2 gives exemplary focal lengths for the various lens elements of afocal attachment 40 in one embodiment.

Afocal attachment 40 in the example embodiment of FIGS. 4A and 4B does not change the focal position of base projection lens 30, but changes the working distance of the overall optical system of projection apparatus 10 in units of number of focal lengths. Afocal attachment 40 is designed to handle modulated light from projection apparatus 30 that provides light at an angular range of about f/8 and has a HFOV of about 12 degrees.

Figure 5A:
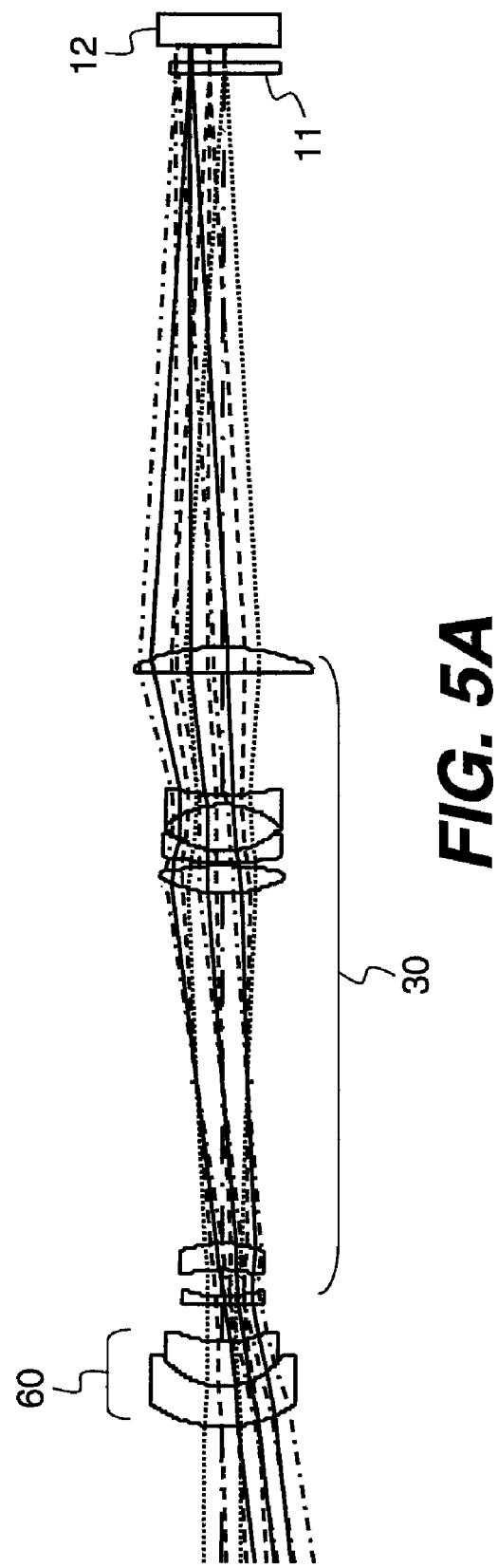
FIG. 5A is a schematic side view showing an afocal attachment added to the projection lens of FIG. 3A in an alternate embodiment for reducing the field of view.
Figure 5B:
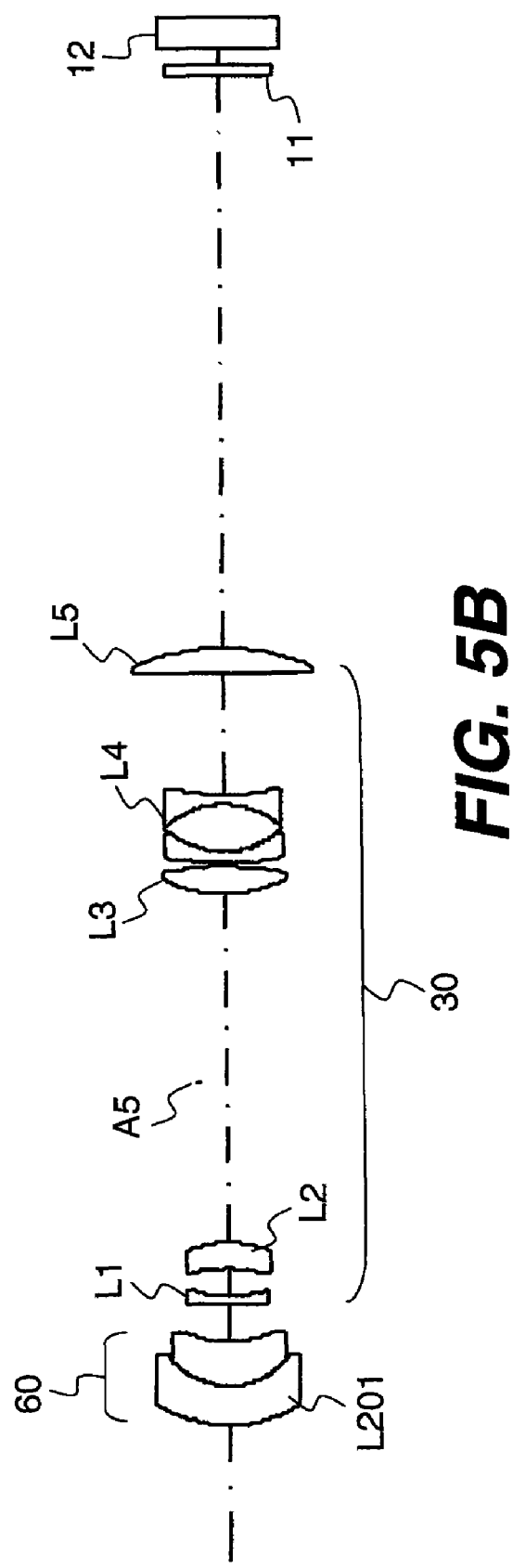
FIG. 5B is an enlarged schematic diagram of the afocal attachment of FIG. 5A relative to the base projection lens.
Figure 5C:
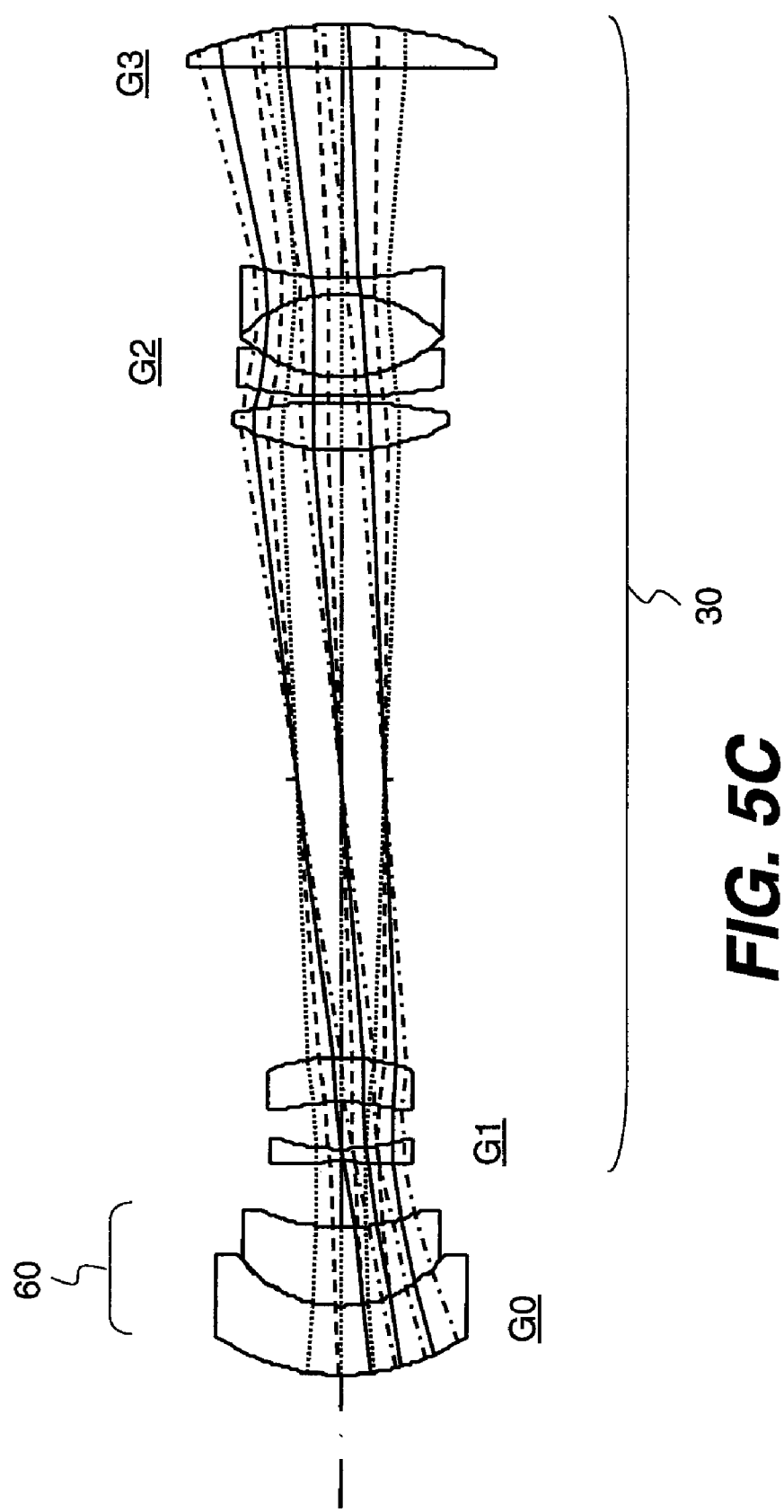
FIG. 5C is a schematic side view showing lens group designations for the afocal attachment and projection lens of FIG. 5A.
Figure 5D:
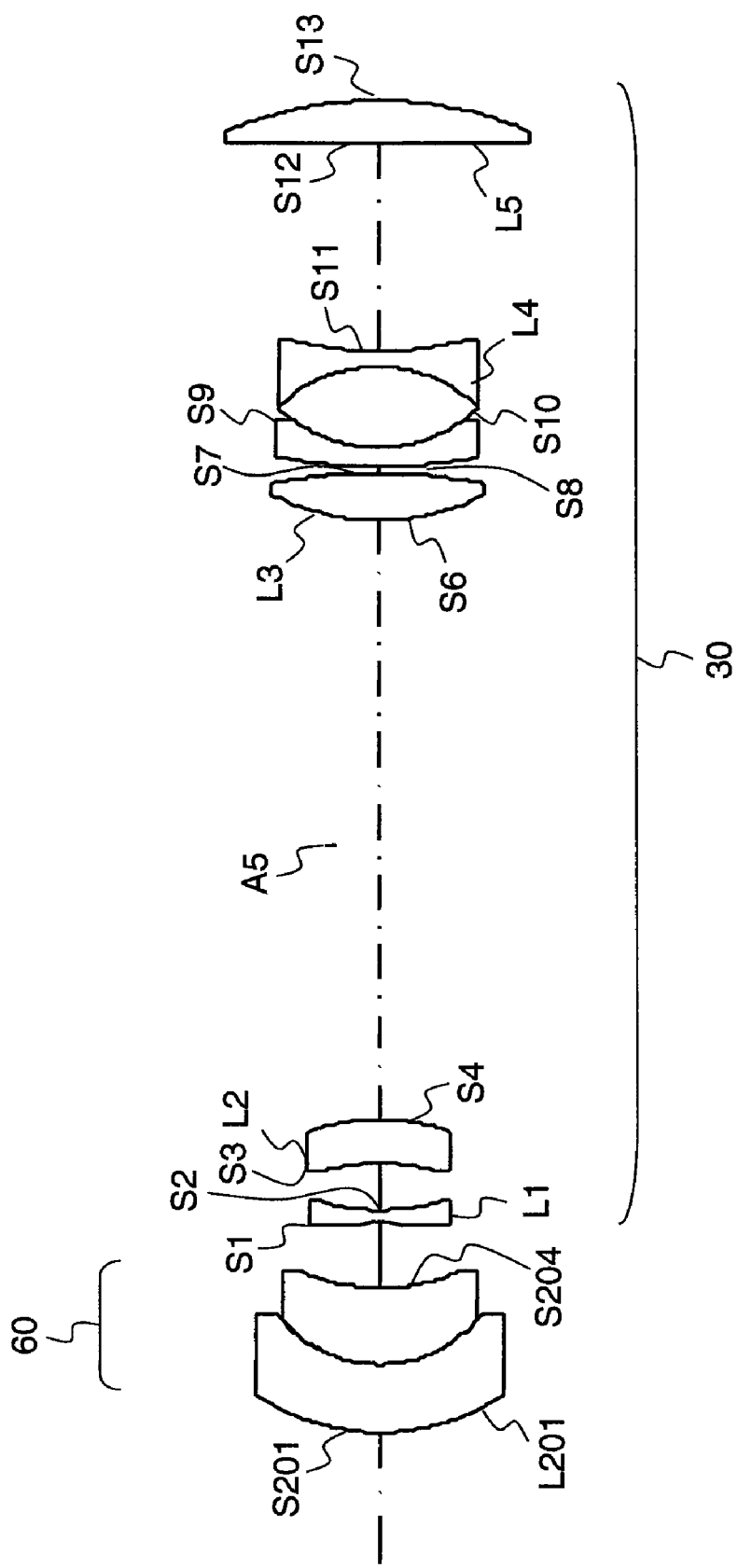
FIG. 5D is a schematic side view showing lens element surface designations for the afocal attachment and projection lens of FIG. 5A.

An afocal attachment can alternately be designed to reduce the field of view of projection apparatus 10. FIGS. 5A through 5E show an afocal attachment 60 that reduces the field of view of base projection lens 30 from its original value (~12 degrees HFOV) to about 9 degrees HFOV. Groups G0, G1, G2, and G3 can be defined as shown in FIG. 5C. Group G3 has a positive focal length. Group G2 has a negative focal length. Group G1 has a negative focal length.

Figure 5E:
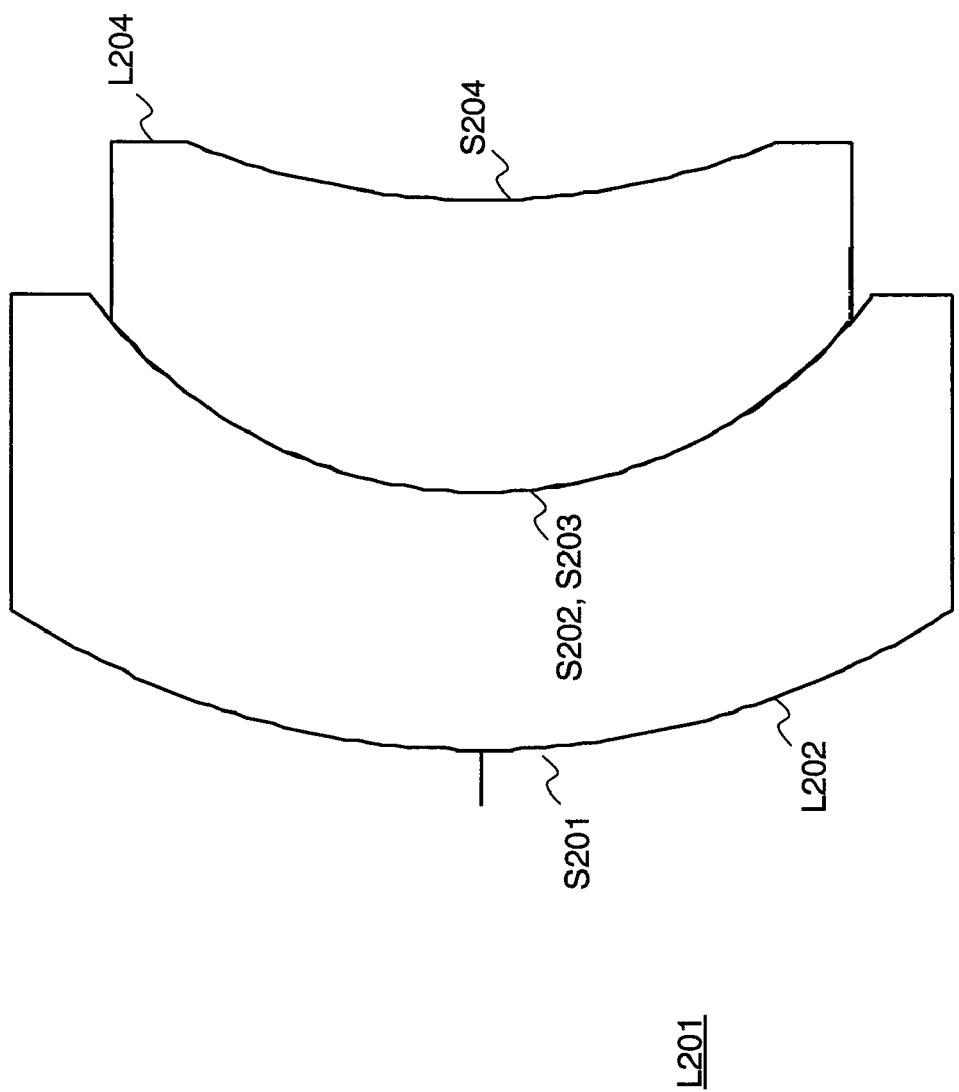
FIG. 5E is an enlarged view of the afocal attachment used in the embodiment of FIG. 5A.

In the embodiment of afocal attachment 60 shown in FIGS. 5A through 5E, lens L201 is a cemented doublet formed from two meniscus lens elements L202 and L204, as shown in the enlarged view of FIG. 5E. This lens design for afocal attachment 60 has a focal length that can be considered to be at infinity and increases the focal length of projection optics from about 60 mm to about 80 mm.

Table 3 gives optical component details for base projection lens 30 and afocal attachment 60 in one embodiment.

With some afocal attachment embodiments, longitudinal color aberration may be a factor, requiring adjustment of spatial light modulator positioning in one or more color channels. Referring back to FIG. 1, for example, this means moving one or more of spatial light modulators 12r, 12g, or 12b to adjust the optical path length for that channel.

Zoom Attachment

Afocal attachment 40 can alternately be provided as a zoom attachment, allowing adjustable reduction or enlargement of the projector field of view. The schematic side views of FIGS. 6A, 6B, and 6C show a 1.5× zoom attachment 44 having three lens elements L151, L152, and L153. and used with a base projection lens 62 having stationary lens elements L130, a cemented triplet formed from lens elements 80, 82, and 84, and L131. FIG. 6A shows this lens zoomed to its largest HFOV position. FIG. 6C shows the lens zoomed to its smallest HFOV position. FIG. 6B shows an intermediate position between these extremes. Table 4 lists data for this lens arrangement. With this design, the back focal length (BFL) for any of the zoom positions is substantially the same.

Using the apparatus of the present invention, base projection lens 30 can be designed so that it has a field of view at a first value that lies toward the middle of a range of field angles. Then, afocal attachments 40, 44, or 60 can be used when it is necessary to adapt the design of the projection apparatus with either a larger or smaller field of view. This same approach can also be advantageous with a zoom attachment. Base projection lens 30 can be designed so that its field of view is in the middle range of the zoom attachment, so that zoom adjustment can change field of view to values above or below this center value. Alternately, base projection lens 30 can be designed to have a lower range of angles, with attachments 40 provided in order to expand the field of view to an appropriate setting. In yet another embodiment, projection lens 30 is designed with a larger field of view and attachments or zoom are used in order to reduce the field of view.

Attachment 40, 44, or 60 can be combined with base projection lens 30 by mounting against base projection lens components, using mounting techniques for lens accessories well known to those skilled in the optical design arts.

The method and apparatus of the present invention support a modular design approach, with potential advantages in cost and flexibility for projection systems. A single base projection lens 30 can be designed and optimized for a type of spatial light modulator and with a particular component placement and packaging arrangement, for example. Then, using this base projection lens 30, any number of afocal attachments 40, 44, or 60 can be developed, making a projection apparatus adaptable to any of a number of different projection venues. Projection lens 30 optics can be telecentric in the short conjugate for projection apparatus that use the afocal attachments 40, 44, or 60 of embodiments of the present invention. Projection optics can be at f/6 or slower, simplifying the design of the optics that handle illumination and modulated light.

The invention has been described in detail with particular reference to certain preferred embodiments thereof, but it will be understood that variations and modifications can be effected within the spirit and scope of the invention. For example, surface curvature and diameter dimensions listed herein for the various lens elements are exemplary. Lens elements could be fabricated from any suitable type of lens glass or other optical material. Lens mounting arrangements of various types can be provided. A variety of types of laser light source could be used, including laser arrays, for example. Any of a number of different types of spatial light modulator 12 can be used, including digital micromirrors, liquid crystal display (LCD) devices, electromechanical grating devices such as grating electromechanical system (GEMS) devices and grating light valve (GLV) devices, or other type of pixellated array device.

Thus, what is provided is a projection apparatus using an afocal attachment for changing the field of view.

TABLE 1

Details for Base Projector 30 Lens Components

| Elem | Surfs S | Focal Length | Diameter |
|---|---|---|---|
| L1 | 1-2 | −48.295180 | 19.8211 |
| L2 | 3-4 | 156.031600 | 20.3616 |
| L3 | 6-7 | 50.795039 | 30.8302 |
| L4 | 8-11 | −34.147467 | 29.1328 |
| L5 | 12-13 | 73.060147 | 44.5705 |

| Group | Surfaces | Focal length (mm) |
|---|---|---|
| G1 | S1-S4 | −88.996 |
| G2 | S6-S11 | −780.272 |
| G3 | S12-S13 | 73.060 |

TABLE 2

Details for Base Lens Plus Afocal Attachment 40

| Elem | Surfs S | Focal Length | Diameter |
|---|---|---|---|
| L101 | 101-2 | −147.540117 | 120.3865 |
| L102 | 103-4 | 314.764070 | 113.7321 |
| L1 | 5-6 | −48.295180 | 19.6521 |
| L2 | 7-8 | 156.031600 | 20.2233 |
| L3 | 10-11 | 50.795039 | 31.0988 |
| L4 | 12-15 | −34.147467 | 29.3727 |
| L5 | 16-17 | 73.060147 | 44.9716 |

| Group | Surfaces | Focal length (mm) |
|---|---|---|
| G0 | S101-S104 | −639.633 |

TABLE 3

Details for Base Projector Lens Plus Afocal Attachment 60 to reduce HFOV

| Elem | Surfs S | Focal Length | Diameter |
|---|---|---|---|
| L201 | 201-4 | 123227.687099 | 35.8733 |
| L1 | 1-2 | −48.295180 | 19.8543 |
| L2 | 3-4 | 156.031600 | 20.3890 |
| L3 | 6-7 | 50.795039 | 30.8866 |
| L4 | 8-11 | −34.147467 | 29.1850 |
| L5 | 12-13 | 73.060147 | 44.6803 |

| Group | Surfaces | Focal length (mm) |
|---|---|---|
| G0 | S201-4 | 123227.687099 |

TABLE 4

Details for Base Lens Plus Zoom Afocal Attachment 44

| Group | Focal Length | Diameter |
|---|---|---|
| L151 | 242.785090 | 73.1578 |
| L152 | −77.648463 | 50.9715 |
| L153 | 126.659987 | 43.3519 |
| L130 | −139.796863 | 35.6109 |
| L131 | 71.468337 | 51.5770 |

PARTS LIST

10. Projection apparatus
11. Cover window
12, 12r, 12g, 12b. Spatial light modulator
14. Combiner
20. Projection lens
24a, 24b, 24c. Display surface
30. Base projection lens
40. Afocal attachment
44. Zoom attachment
60. Afocal attachment
62. Base projection lens
64, 64'. Projected image
80, 82, 84. Lens element
100. Projection apparatus
A5. Aperture
G1, G2, G3. Lens group
L1, L2, L3, L4, L5, L101, L102, L130, L131, L151, L152, L153, L201, L202, L204. Lens element
S1, S2, S2, S4, S5, S6, S7, S8, S9, S10, S11, S12, S13, S101, S102, S103, S104, S201, S202, S203, S204. Surface
x, y. Axis
θ1, θ2. Half field of view

The invention claimed is:

1. A projection apparatus comprising:
   a) at least one spatial light modulator disposed to modulate illumination from a laser light source;
   b) a base projection lens comprising, from its long conjugate side to its short conjugate side along an optical axis:
      (i) a first lens group having a negative focal length and having at least a first lens element that has a negative focal length and a second lens element that has a positive focal length;
      (ii) a second lens group spaced apart from the first lens group and having one or more lens elements, wherein the second lens group has a negative focal length;
      (iii) a third lens group spaced apart from the second lens group and comprising a lens having a positive focal length;
   wherein the base projection lens has a first field of view and is telecentric in its short conjugate; and
   c) an afocal attachment to the base projection lens that alters the first field of view by substantially the same amount in both of two orthogonal directions.

2. The projection apparatus of claim 1 wherein the afocal attachment comprises a negative lens element and a positive lens element.

3. The projection apparatus of claim 1 wherein the at least one spatial light modulator is taken from the group consisting of a digital micromirror device, a liquid crystal display (LCD) device, and an electromechanical grating device.

4. The projection apparatus of claim 1 wherein the afocal attachment provides a second field of view that is larger than the first field of view in both orthogonal directions.

5. The projection apparatus of claim 1 wherein the afocal attachment provides a second field of view that is smaller than the first field of view in both orthogonal directions.

6. The projection apparatus of claim 1 wherein the afocal attachment comprises a cemented doublet.

7. The projection apparatus of claim 1 wherein at least the second lens group comprises one or more cemented lens elements.

8. The projection apparatus of claim 1 wherein the afocal attachment is a zoom lens.

9. The projection apparatus of claim 8 wherein the zoom lens comprises a first lens closest to the base projection lens, wherein the first lens is a positive meniscus lens.

10. A projector comprising:
    a) a base projection apparatus comprising:
       at least one laser light source that provides illumination to a spatial light modulator;
       a base projection lens that is telecentric in its short conjugate and has a back focal length of at least 2 times the focal length with an f-number larger than about f/6; and
    b) an afocal attachment mountable on the projector and changing the field of view of the base projection apparatus, substantially equally in two orthogonal directions, by at least 10%.

11. The projector of claim 10 wherein the afocal attachment is a zoom lens.

12. The projector of claim 10 wherein the afocal attachment comprises at least one negative lens element and at least one positive lens element.

13. The projector of claim 10 wherein the spatial light modulator is taken from the group consisting of a digital micromirror device, a liquid crystal display (LCD) device, and an electromechanical grating device.

14. The projector of claim 10 wherein the afocal attachment provides a second field of view that is larger than the first field of view in both orthogonal directions.

15. The projector of claim 10 wherein the afocal attachment provides a second field of view that is smaller than the first field of view in both orthogonal directions.

16. The projector of claim 10 wherein the afocal attachment comprises a cemented doublet.

17. A method for projecting an image onto a display surface comprising:
    a) modulating laser illumination at one or more spatial light modulators and directing the modulated light through a base projection lens having a first half field of view; and
    b) disposing an afocal attachment in the path of light from the base projection lens, wherein the afocal attachment alters the first half field of view equally in two orthogonal directions.

18. The method of claim 17 wherein the afocal attachment reduces the first half field of view.

19. The method of claim 17 wherein the afocal attachment enlarges the first half field of view.

20. The method of claim 17 wherein the afocal attachment is a zoom lens.

* * * * *